(12) United States Patent
Mochida et al.

(10) Patent No.: US 12,301,436 B2
(45) Date of Patent: May 13, 2025

(54) VIDEO TRANSMISSION SYSTEM, VIDEO TRANSMISSION METHOD AND VIDEO TRANSMITTER

(71) Applicant: Nippon Telegraph and Telephone Corporation, Tokyo (JP)

(72) Inventors: Yasuhiro Mochida, Musashino (JP); Takuro Yamaguchi, Musashino (JP); Daisuke Shirai, Musashino (JP); Takahiro Yamaguchi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/265,800

(22) PCT Filed: Dec. 11, 2020

(86) PCT No.: PCT/JP2020/046307
§ 371 (c)(1),
(2) Date: Jun. 7, 2023

(87) PCT Pub. No.: WO2022/123774
PCT Pub. Date: Jun. 16, 2022

(65) Prior Publication Data
US 2024/0039817 A1   Feb. 1, 2024

(51) Int. Cl.
*H04L 43/0852* (2022.01)
*H04L 65/65* (2022.01)
(52) U.S. Cl.
CPC .......... *H04L 43/0852* (2013.01); *H04L 65/65* (2022.05)

(58) Field of Classification Search
CPC ........................... H04L 43/0852; H04L 65/65
See application file for complete search history.

(56) References Cited

U.S. PATENT DOCUMENTS 7,684,324 B2 * 3/2010 Clark ..................... H04L 47/50
370/395.42
8,279,884 B1 * 10/2012 Narasimha ............ H04L 47/365
370/410

(Continued)

FOREIGN PATENT DOCUMENTS

JP    2015-177296    10/2015
JP    2018-121214    8/2018

(Continued)

OTHER PUBLICATIONS

[No Author Listed], "SMPTE Standard: 2017 Professional Media Over Managed IP Networks: Uncompressed Active Video," Society of Motion Picture and Television Engineers, Sep. 2017, SPMTE ST 2110-20:2017, 22 pages.

(Continued)

*Primary Examiner* — Nazia Naoreen
(74) *Attorney, Agent, or Firm* — Fish & Richardson P.C.

(57) ABSTRACT

A video transmission system includes a video transmitter for storing a packet of video data in a transmitting buffer and transmitting the packet stored in the transmitting buffer, a video receiver for receiving the packet, and an estimation unit for estimating a characteristic of a transmission line between the video transmitter and the video receiver from an arrival time of each packet in the video receiver. The video transmitter transmits a packet at a timing specified from an inverse characteristic of a characteristic of the transmission line.

6 Claims, 6 Drawing Sheets

(56) References Cited

U.S. PATENT DOCUMENTS

| | | | |
|---|---|---|---|
| 10,051,312 B2* | 8/2018 | Sprenger | H04N 21/4305 |
| 10,313,276 B2* | 6/2019 | Jansson | H04L 65/612 |
| 10,419,766 B2* | 9/2019 | LaBosco | H03L 7/06 |
| 2006/0268701 A1 | 11/2006 | Clark | |
| 2007/0165524 A1 | 7/2007 | Mascolo | |
| 2019/0068486 A1* | 2/2019 | Maehara | H04L 45/24 |
| 2019/0215385 A1* | 7/2019 | Ethier | H04L 45/123 |

FOREIGN PATENT DOCUMENTS

| | | |
|---|---|---|
| WO | WO 2009/113924 | 9/2009 |
| WO | WO 2013/065477 | 5/2013 |

OTHER PUBLICATIONS

[No Author Listed], "SMPTE Standard: 2017 Professional Media Over Managed IP Networks: Traffic Shaping and Delivery Timing for Video," Society of Motion Picture and Television Engineers, Nov. 2017, SPMTE ST 2110-21:2017, 17 pages.

[No Author Listed], "SMPTE Standard: 2013 Seamless Protection Switching of SMPTE ST 2022 IP Datagrams," Society of Motion Picture and Television Engineers, Dec. 2018, SMPTE ST 2022-7:2019, 11 pages.

\* cited by examiner

[Fig. 1]
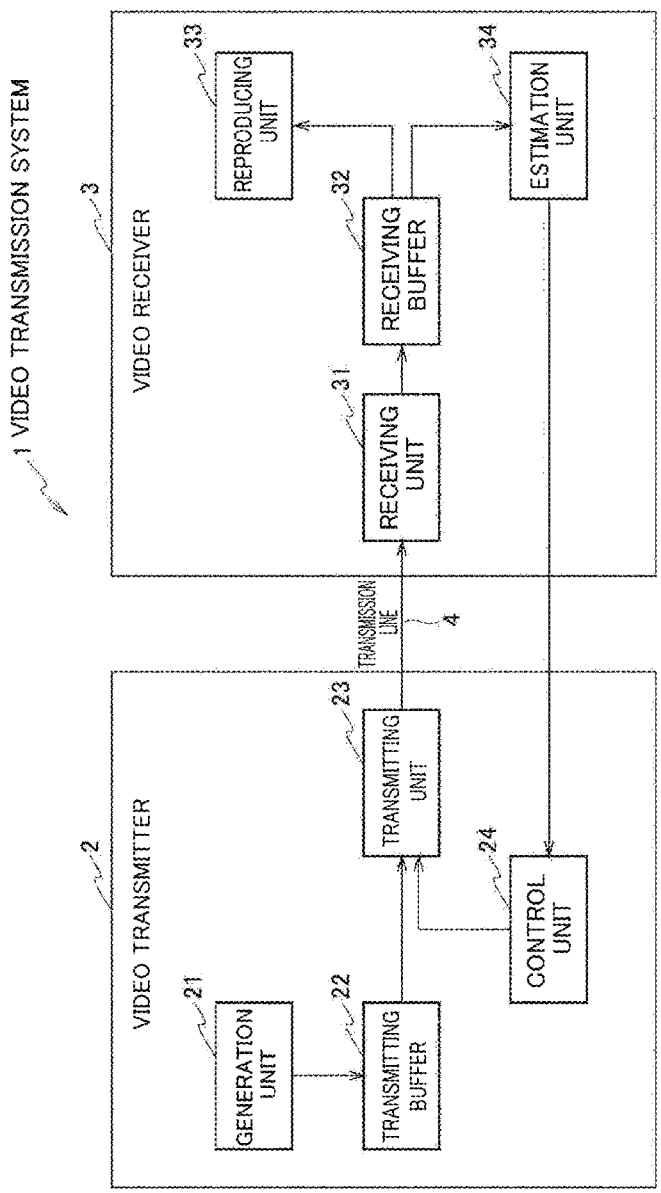

[Fig. 2]
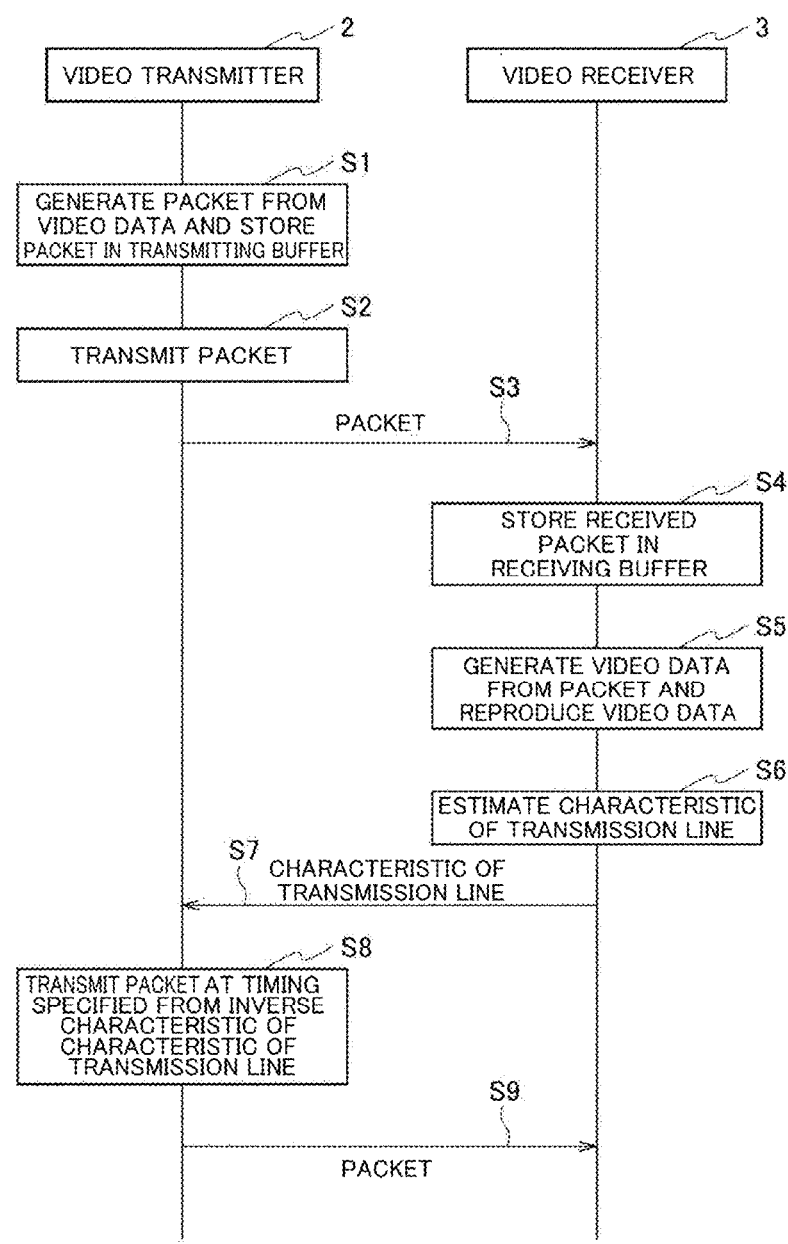

[Fig. 3]

| k | 0 | 1 | 2 | 3 | 4 | 5 | ..... |
|---|---|---|---|---|---|---|-------|
| $T_{IDEAL}(k)$ | 0 | 2 | 4 | 6 | 8 | 10 | ..... |
| $T_{OBSERVED}(k)$ | 0 | 3 | 4 | 7 | 10 | 11 | ..... |
| $T_{JITTER}(k)$ | 0 | 1 | 0 | 1 | 2 | 1 | ..... |

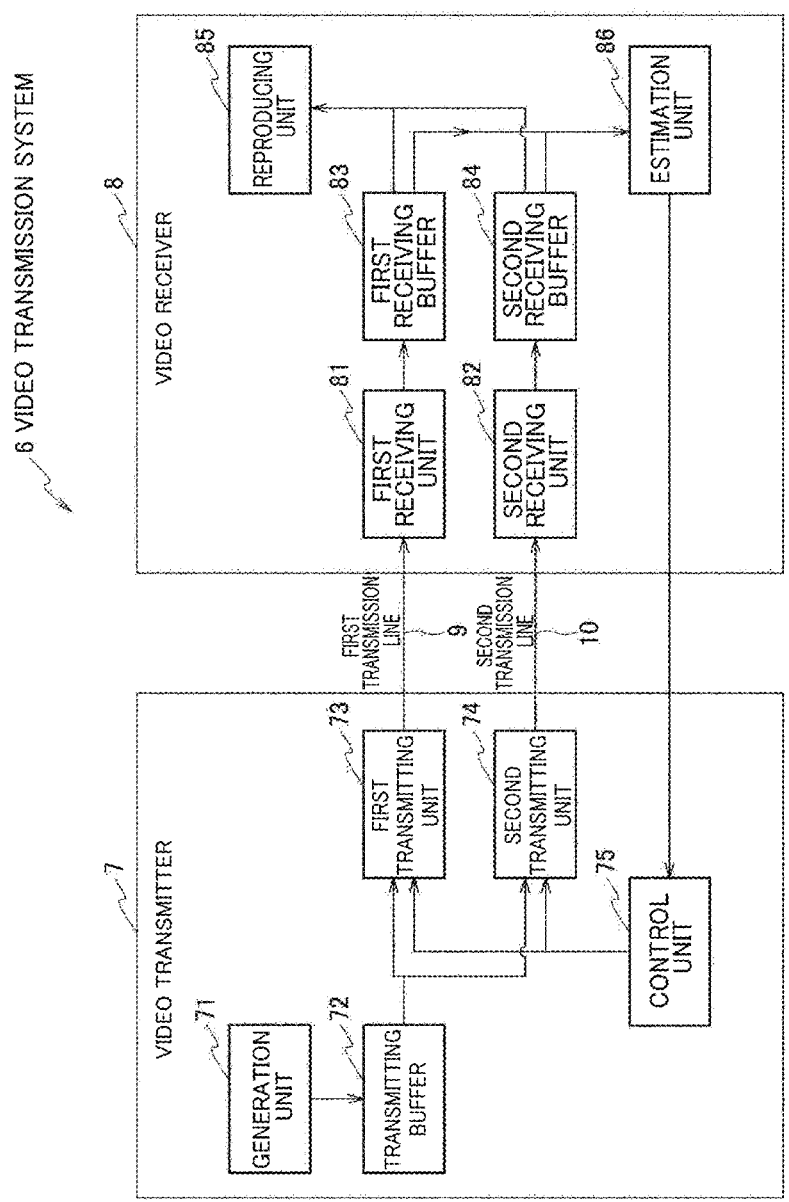
[Fig. 4]

[Fig. 5]
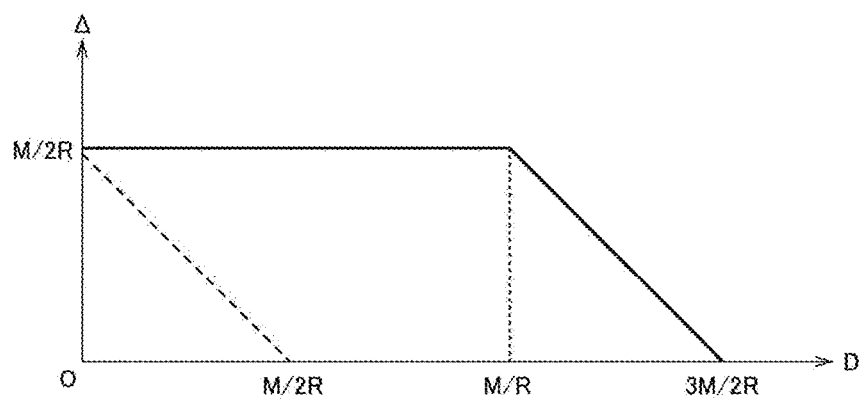

[Fig. 6]
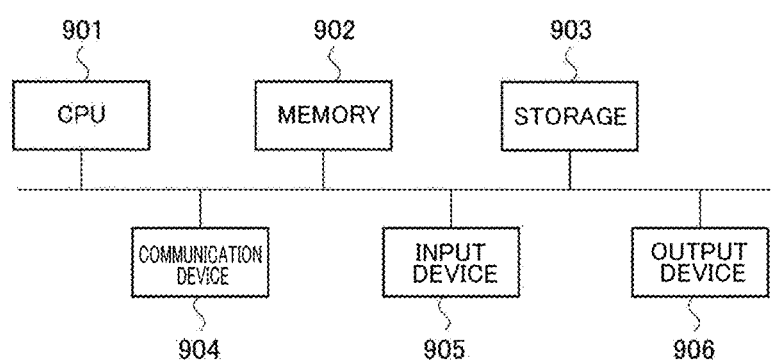

VIDEO TRANSMISSION SYSTEM, VIDEO TRANSMISSION METHOD AND VIDEO TRANSMITTER

CROSS-REFERENCE TO RELATED APPLICATIONS

This application is a National Stage application under 35 U.S.C. § 371 of International Application No. PCT/JP2020/046307, having an International Filing Date of Dec. 11, 2020.

The disclosure of the prior application is considered part of the disclosure of this application, and is incorporated by reference in its entirety into this application.

TECHNICAL FIELD

The present invention relates to a video transmission system, a video transmission method and a video transmitter.

BACKGROUND ART

As to a scheme for transmitting uncompressed video and audio through a communication network, there are Non Patent Literatures 1 to 3.

Non Patent Literature 1 discloses a method for transmitting a packet in which video essence is stored in a Real-time Transport Protocol (RTP) payload. In uncompressed video transmission, the number of packets per frame is constant as long as a pixel mapping method to RTP packets and a video parameter are not changed.

Non Patent Literature 2 discloses a transmission timing model of a desirable RTP packet in the uncompressed video transmission. In a linear model, the RTP packet transmission interval is always constant. A gapped model is a timing model based on the serial digital interface (SDI). In the gapped model, RTP packets are transmitted at fixed intervals only in a period corresponding to the effective pixel of the SDI in each frame. The receiver is designed based on a transmission timing model.

Non Patent Literature 3 discloses fully redundant transmission (seamless protection) for coping with packet loss on the communication network. In the seamless protection, the same RTP packet is transmitted through two different paths. The receiving side integrates the RTP packets received from the two paths, respectively, on the basis of the sequence number of the RTP header. Thus, the loss of the RTP packet in one path can be compensated.

CITATION LIST

Non Patent Literature

Non Patent Literature 1: SMPTE ST 2110-20: 2017 Professional Media Over Managed IP Networks: Uncompressed Active Video
Non Patent Literature 2: SMPTE ST 2110-21: 2017 Professional Media Over Managed IP Networks: Traffic Shaping and Delivery Timing for Video
Non Patent Literature 3: SMPTE ST 2022-7: 2013 Seamless Protection Switching of SMPTE ST 2022 IP Datagrams

SUMMARY OF INVENTION

Technical Problem

However, a transmission line may affect the receiving timing of the RTP packet in which the video data is set on the receiving side. For example, delay jitter may occur due to accumulation of packets in a network device on the transmission line. In order to compensate for the delay of RTP packet arrival due to the delay jitter, a receiving buffer having a capacity larger than the fluctuation width of the delay jitter is required. When the arrival interval of the RTP packet is clogged, the receiving side cannot fetch the RTP packet into the receiving buffer due to the specification of the hardware or the like on the receiving side, and thus the RTP packet may be missed.

With the foregoing in view, an object of the present invention is to provide a technique capable of canceling an influence of a transmission line on an arrival timing of a packet in which video data is set.

Solution to Problem

A video transmission system of an aspect of the present invention includes: a video transmitter that stores a packet of video data in a transmitting buffer and transmits the packet stored in the transmitting buffer; a video receiver that receives the packet; and an estimation unit that estimates a characteristic of a transmission line between the video transmitter and the video receiver from an arrival time of each packet in the video receiver, and the video transmitter transmits the packet at a timing specified from an inverse characteristic of the characteristic of the transmission line.

A video transmission method of an aspect of the present invention includes: a step of storing, by a video transmitter, a packet of video data in a transmitting buffer and transmitting the packet stored in the transmitting buffer; a step of receiving, by a video receiver, the packet; a step of estimating, by a computer, a characteristic of a transmission line between the video transmitter and the video receiver from an arrival time of each packet in the video receiver; and a step of transmitting, by the video transmitter, the packet at a timing specified from an inverse characteristic of the characteristic of the transmission line.

A video transmitter of an aspect of the present invention includes: a transmitting buffer that stores a packet of video data; a transmitting unit that transmits the packet stored in the transmitting buffer to the video receiver; and a control unit that receives a characteristic of a transmission line between the video transmitter and the video receiver estimated from an arrival time of each packet, from the video receiver, and performs control of transmitting, by the transmitting unit, the packet at a timing specified from an inverse characteristic of the characteristic of the transmission line. A video receiver of an aspect of the present invention that is connected to a video transmitter configured to store a packet of video data in a transmitting buffer and transmits the packet stored in the transmitting buffer, the video receiver includes: a receiving unit that receives the packet from the video transmitter; and an estimation unit that estimates a characteristic of a transmission line between the video transmitter and the video receiver from an arrival time of each packet.

An aspect of the present invention is a program which causes a computer to function as the video transmitter or the video receiver.

Advantageous Effects of Invention

According to the present invention, it is possible to provide a technique capable of canceling an influence of a transmission line on an arrival timing of a packet in which video data is set.

BRIEF DESCRIPTION OF DRAWINGS

FIG. 1 is a diagram for describing a system configuration of a video transmission system and each functional block of a video transmitter and a video receiver according to a first embodiment of the present invention.

FIG. 2 is a sequence diagram for describing a video transmission method in the video transmission system according to the first embodiment of the present invention.

FIG. 3 is an example for describing an ideal arrival time of a packet, an observed arrival time, and a situation of delay jitter.

FIG. 4 is a diagram for describing a system configuration of a video transmission system and each functional block of a video transmitter and a video receiver according to a second embodiment of the present invention.

FIG. 5 is a diagram for describing a jitter allowable time extended by a third embodiment of the present invention.

FIG. 6 is a diagram for describing a hardware configuration of a computer used as the video transmitter and the video receiver.

DESCRIPTION OF EMBODIMENTS

Hereinafter, embodiments of the present invention will be described with reference to the drawings. Same parts in the drawings will be designated by same reference characters and descriptions thereof will be omitted.

First Embodiment (Video Transmission System)

The video transmission system 1 includes a video transmitter 2 and a video receiver 3. The video transmitter 2 and the video receiver 3 are connected to each other so as to be able to communicate with each other via a transmission line 4. The video transmitter 2 and the video receiver 3 synchronize time by Precision Time Protocol (PTP), or the like.

The video transmitter 2 converts video data into a plurality of packets. The video transmitter 2 transmits the converted packet to a video receiver 3 via the transmission line 4. The video data is a video essence to be reproduced.

The video receiver 3 receives the packet from the video transmitter 2 via the transmission line 4. The video receiver 3 generates the video data from each received packet and reproduces the generated video data.

In the first embodiment, the video transmitter 2 includes a transmitting buffer 22, and temporarily stores packets in the transmitting buffer 22. The video transmitter 2 transmits the packet stored in the transmitting buffer 22 in accordance with a reverse characteristic of a characteristic of the transmission line 4 estimated by the video receiver 3. In the first embodiment, the characteristic of the transmission line 4 is estimated from arrival time of the packet.

In the video transmission system 1 according to the first embodiment, the video receiver 3 calculates delay jitter as an influence of the transmission line 4 on the arrival timing of the packet in which the video data is set. The video receiver 3 specifies the characteristics of the transmission line 4 from the delay jitter. The video transmitter 2 temporarily stores the packet in the transmitting buffer 22 and transmits the packet in accordance with the reverse characteristic of the characteristic of the transmission line 4 specified from the delay jitter by the video receiver 3 to cancel the characteristic of the specified transmission line 4. Thus, the video transmission system 1 can compensate the delay jitter in the video receiver 3 by adjusting transmission timing in the video transmitter 2 by using the transmitting buffer 22.

The video transmitter 2 includes a generation unit 21, a transmitting buffer 22, a transmitting unit 23, and a control unit 24. The generation unit 21, the transmitting unit 23, and the control unit 24 are mounted on a CPU 901. The transmitting buffer 22 is formed in a memory 902 or a storage 903. The video transmitter 2 stores the packet of the video data in the transmitting buffer 22 and transmits the packet stored in the transmitting buffer 22.

The generation unit 21 generates the packet of video data and stores the generated packet in the transmitting buffer 22. The packet is a packet based on a protocol for transferring video data in real time, such as an RTP packet. As a method of making video data into RTP packets, there is, for example, Non Patent Literature 1.

The transmitting buffer 22 stores the RTP packet of video data. The transmitting buffer 22 stores each RTP packet until the transmission timing controlled by the control unit 24 comes.

The transmitting unit 23 transmits the RTP packet stored in the transmitting buffer 22 to the video receiver 3. The transmitting unit 23 transmits the packet at designated timing by the control unit 24. Specifically, the transmitting unit 23 transmits the packet at a timing specified from the inverse characteristic of the characteristic of the transmission line 4.

The transmitting unit 23 stores the RTP packet in an arbitrary network protocol packet and transmits it to the transmission line 4. As the network protocol, User Datagram Protocol (UDP)/Internet Protocol (IP)/Ethernet may be used. The type of the transmission line is not limited. A wavelength path to which a wavelength is assigned exclusively may be used.

The control unit 24 receives the characteristics of the transmission line 4 from the video receiver 3, and the transmitting unit 23 performs control to transmit the packet at the timing specified from the reverse characteristics of the characteristics of the transmission line 4. Specifically, the control unit 24 determines the timing at which the transmitting unit 23 transmits the packet from the reverse characteristic of the characteristic of the transmission line 4 estimated in the video receiver 3. Here, the inverse characteristic is a characteristic for canceling the delay jitter caused by the estimated characteristic of the transmission line 4. Note that the control unit 24 receives the characteristics of the transmission line 4 from the video receiver 3 via the transmission line 4 or other communication network.

An arbitrary method is used as a control method of the transmission timing performed by the control unit 24. For example, there are a method in which the control unit 24 notifies the transmitting unit 23 when the transmission timing reaches, and a method in which the control unit 24 notifies the transmitting unit 23 of the transmission timing and the transmitting unit 23 transmits at the transmission timing in accordance with the notified transmission timing.

The video receiver 3 includes a receiving unit 31, a receiving buffer 32, a reproducing unit 33, and an estimation unit 34. The receiving unit 31, the reproducing unit 33, and the estimation unit 34 are mounted on the CPU 901. The receiving buffer 32 is formed in the memory 902 or the storage 903. The video receiver 3 specifies the characteristics of the transmission line 4 between the video transmitter 2 and the video receiver 3 estimated from the arrival time of each packet, and transmits the characteristics to the video transmitter 2.

The receiving unit 31 receives the packet from the video transmitter 2 via the transmission line 4. The receiving unit 31 stores the received packet in the receiving buffer 32. Specifically, the receiving unit 31 extracts the RTP packet from an arbitrary network protocol packet stored by the transmitting unit 23, and stores the RTP packet in the receiving buffer 32.

The receiving buffer 32 temporarily stores the RTP packet extracted by the receiving unit 31. The receiving buffer 32 records the arrival time of each packet and inputs it to the estimation unit 34. The arrival time of each packet may be measured by the receiving unit 31.

The reproducing unit 33 forms video data from the RTP packet stored in the receiving buffer 32 and reproduces the video data on a display or the like (not shown).

The estimation unit 34 estimates characteristics of the transmission line 4 between the video transmitter 2 and the video receiver 3 from the arrival time of each packet in the video receiver 3. Here, the characteristic of the transmission line 4 is estimated from the delay jitter of each packet. Processing performed in the estimation unit 34 will be described later.

In the embodiment of the present invention, the case where the video transmitter 2 is provided with the control unit 24 and the video receiver 3 is provided with the estimation unit 34 will be described, but the present invention is not limited thereto. For example, the control unit 24 and the estimation unit 34 may be provided in a server capable of communicating with each of the video transmitter 2 and the video receiver 3. Further, either one of the video transmitter 2 or the video receiver 3 may be provided with both the control unit 24 and the estimation unit 34. The video transmission system 1 may be formed in any way as long as the video transmitter 2 can transmit the packet with the reverse characteristic of the characteristic of the transmission line.

The following describes the video transmission method according to the embodiment of the present invention with reference to FIG. 2. In the example shown in FIG. 2, the video transmitter 2 first transmits packets sequentially. A description will be given regarding the case where the video transmitter 2 transmits the packet in accordance with the reverse characteristic of the estimated characteristic after the characteristic of the transmission line 4 is estimated in the video receiver 3.

First, in step S1, the video transmitter 2 generates a plurality of RTP packets from video data. The video transmitter 2 stores each of the generated RTP packets in the transmitting buffer 22. In step S2, the video transmitter 2 sequentially transmits the RTP packet stored in the transmitting buffer 22 to the video receiver 3. In step S3, the RTP packet is transmitted from the video transmitter 2 to the video receiver 3.

In step S4, the video receiver 3 stores the received RTP packets in the receiving buffer 32. In step S5, the video receiver 3 generates video data from the received RTP packet and reproduces the video data.

In step S6, the video receiver 3 estimates the characteristics of the transmission line 4 from the arrival time of each RTP packet. In step S7, the video receiver 3 transmits the estimated characteristics of the transmission line 4 to the video transmitter 2.

In step S8, the video transmitter 2 transmits the RTP packet at the timing specified from the inverse characteristic of the characteristic of the transmission line 4 transmitted in the step S6. In step S9, the RTP packet is transmitted from the video transmitter 2 to the video receiver 3.

According to the video transmission system 1 descried above, the RTP packet is transmitted from the video transmitter 2 to the video receiver 3 in accordance with the reverse characteristic of the characteristic of the transmission line. The video transmission system 1 suppresses the delay jitter generated in the video receiver 3 and missing of RTP packets. The video transmission system 1 can smooth the arrival timing of the RTP packet in the video receiver 3.

An example of the method of estimating the characteristics of the transmission line 4 will be described. The estimation unit 34 acquires the arrival time in the video receiver 3 about an RTP packet group which is an estimation object. The estimation object is, for example, a packet group for forming one frame of video data. As another example, the object to be estimated may be a packet group received within a predetermined time such as one second.

A sequence of ideal arrival times of packets of the packet group to be estimated is defined as $T_{IDEAL}(k)$. However, when k is an index of RTP packets in a frame and the number of packets to be estimated is N, $0 \leq k \leq N-1$ is satisfied. The ideal arrival time of the RTP packet is identified from the transmission timing model.

When the first RTP packet arrival time of the estimation object is set to 0, $T_{IDEAL}(k)=C*k$ is established. C is an ideal RTP packet transmission interval based on the transmission timing model.

A sequence of each RTP packet arrival time of the packet group of the estimation object observed by the video receiver 3 is defined as a $T_{OBSERVED}(k)$. The delay jitter $T_{JITTER}(K)$ received by the k-th RTP packet is expressed by $T_{JITTER}(K)=T_{OBSERVED}(K)-T_{IDEAL}(K)$.

FIG. 3 shows an example of $T_{IDEAL}(K)$, $T_{OBSERVED}(K)$ and $T_{JITTER}(K)$. In the example shown in FIG. 3, $T_{IDEAL}(K)$ is expressed by 2*k and increases. On the other hand, $T_{OBSERVED}(K)$ causes a delay to $T_{IDEAL}(K)$ The estimation unit 34 specifies an estimated delay jitter pattern J(k) as the characteristic of the transmission line 4. The estimation unit 34 may adopt a delay jitter pattern obtained by averaging $T_{JITTER}(k)$ for a plurality of frames as the J (k). The estimation unit 34 may adopt a delay jitter pattern predicted by deep learning or the like from $T_{JITTER}(k)$ in a plurality of most recent frames as the J (k). The estimation unit 34 transmits the estimated characteristics of the transmission line 4 to the video transmitter 2.

Next, a method of specifying the transmission timing of the RTP packet will be described. The control unit 24 of the video transmitter 2 acquires characteristics of the transmission line 4 estimated in the video receiver 3. The control unit 24 controls the transmission timing $T_{CONTROL}(k)$ of the RTP packet by the transmitting unit 23 such that $T_{CONTROL}(k)=C*k-J(k)$ is satisfied. Here, the control unit 24 controls the transmission timing for a subsequent packet of the estimation object estimated by the estimation unit 34. The control unit 24 controls the transmission timing for a packet of a frame to be transmitted after the frame estimated by the estimation unit 34.

The estimation unit 34 may perform the above estimation at the start of transmitting of the RTP packet, and the control unit 24 operates with the fixed $T_{CONTROL}(k)$. Alternatively, the estimation unit 34 may perform estimation as needed during operation to dynamically change $T_{CONTROL}(k)$. In the case of performing estimation as needed, the estimation unit 34 may periodically estimate. Alternatively, the estimation unit 34 may monitor the magnitude of delay jitter in the video receiver 3 and perform estimation when the reference value exceeds the threshold value. As the reference value, an L1 norm or an L2 norm of $T_{JITTER}(k)$ may be used.

Thus, the RTP packet arrival interval observed by the receiving buffer 32 is smoothed, and the effect of preventing the missing of the RTP packet can be expected. Further, the effect of reducing the size of the receiving buffer required for absorbing the delay jitter can be expected. Further, since the buffer size is reduced, a delay reduction effect can be expected, and the present embodiment contributes to reduction of the necessary memory device capacity, and thus reduction of the cost and the mounting area can be expected.

Second Embodiment

A video transmission system 6 according to a second embodiment of the present invention will be described with reference to FIG. 4. While the video transmission system 1 according to the first embodiment specifies the characteristics of the transmission line 4 from the delay jitter of the packet, the video transmission system 6 according to the second embodiment calculates a RTP packet arrival time difference of a seamless protection as the influence of the first transmission line 9 and the second transmission line 10 on the arrival timing of the packet in which the video data is set. The video transmission system 6 specifies the characteristics of the first transmission line 9 and the second transmission line 10 from the arrival time difference of the RTP packet. The second embodiment is described with focusing the differences from those of the first embodiment.

The video transmission system 6 includes a video transmitter 7 and a video receiver 8. The video transmitter 7 and the video receiver 8 are connected to each other by the first transmission line 9 and the second transmission line 10 so as to be communicable with each other.

In the second embodiment, the video transmitter 7 includes a transmitting buffer 72, and temporarily stores packets in the transmitting buffer 72. The video transmitter 7 cancels the specified characteristics of the first transmission line 9 and the second transmission line 10 by transmitting the packet stored in the transmitting buffer 72 in accordance with the reverse characteristics of the characteristics of the first transmission line 9 and the second transmission line 10 estimated by the video receiver 3. The characteristics of the first transmission line 9 and the second transmission line 10 are estimated from an arrival time difference between the packet received from the first transmission line 9 and the packet received from the second transmission line 10.

The video transmitter 7 includes a generation unit 71, a transmitting buffer 72, a first transmitting unit 73, a second transmitting unit 74, and a control unit 75. The generation unit 71, the first transmitting unit 73, the second transmitting unit 74, and the control unit 75 are mounted on the CPU 901. The transmitting buffer 72 is formed in a memory 902 or a storage 903. The video transmitter 7 stores the packet of video data in the transmitting buffer 72, and transmits the packet stored in the transmitting buffer 72 to each of the first transmission line 9 and the second transmission line 10.

The generation unit 71 generates the RTP packet of video data and stores the generated RTP packet in the transmitting buffer 72.

The transmitting buffer 72 stores the RTP packet of video data. The transmitting buffer 72 stores each RTP packet until the transmission timing controlled by the control unit 24 comes for each of the first transmitting unit 73 and the second transmitting unit 74. The transmitting buffer 72 stores one RTP packet for one sequence number. The one RTP packet is stored in the transmitting buffer 72 until it is transmitted to the video receiver 8 by each of the first transmitting unit 73 and the second transmitting unit 74.

The first transmitting unit 73 and the second transmitting unit 74 transmit the RTP packet stored in the transmitting buffer 22 to the video receiver 3. The first transmitting unit 73 transmits the RTP packet via the first transmission line 9. The second transmitting unit 74 transmits the RTP packet via the second transmission line 10. The first transmitting unit 73 and the second transmitting unit 74 transmit the packet at the timing designated by the control unit 75. Specifically, the first transmitting unit 73 and the second transmitting unit 74 transmit the packet to the transmission line having an early arrival time after a time in accordance with an arrival time difference has elapsed after the packet is transmitted to the transmission line having a late arrival time.

The control unit 75 receives characteristics of the first transmission line 9 and the second transmission line 10 from the video receiver 8, and controls a timing specified from the inverse characteristics of the characteristics of the first transmission line 9 and the second transmission line 10 for the first transmitting unit 73 and the second transmitting unit 74 transmitting packets. Here, the characteristics of the first transmission line 9 and the second transmission line are the difference of arrival times when the video transmitter 7 simultaneously transmits RTP packets having the same sequence numbers to the video receiver 8. The reverse characteristic is a characteristic for canceling the delay when the RTP packet having the same sequence number is transmitted via each of the first transmission line 9 and the second transmission line 10. Specifically, the control unit 24 determines the timing at which each of the first transmitting unit 73 and the second transmitting unit 74 transmits the packet such that the RTP packets having the same sequence numbers arrive at the video receiver 8 at the same time. Note that the control unit 75 receives the characteristics from the video receiver 8 via the first transmission line 9, the second transmission line 10 or other communication networks.

The video receiver 8 includes a first receiving unit 81, a second receiving unit 82, a first receiving buffer 83, a second receiving buffer 84, a reproducing unit 85 and an estimation unit 86. The first receiving unit 81, the second receiving unit 82, the reproducing unit 85, and the estimation unit 86 are mounted on the CPU 901. The first receiving buffer 83 and the second receiving buffer 84 are formed in the memory 902 or the storage 903. The video receiver 8 complements and reproduces the packet received from each of the first transmission line 9 and the second transmission line 10. The video receiver 8 transmits the characteristics of the first transmission line 9 and the second transmission line 10 between the video transmitter 2 and the video receiver 3 estimated from the arrival time difference of each packet to the video transmitter 7.

The first receiving unit 81 receives the RTP packet from the first transmission line 9. The first receiving unit 81 stores the received RTP packet in the first receiving buffer 83. The second receiving unit 82 receives the RTP packet from the second transmission line 10. The second receiving unit 82 stores the received RTP packet in the second receiving buffer 84.

The reproducing unit 85 forms video data from the RTP packets stored in the first receiving buffer 83 and the second receiving buffer 84 and reproduces the video data on a display (not shown) or the like. The reproducing unit 85 integrates two RTP packets to which the same sequence number is attached, compensates for the missing of the RTP packet, and reproduces the video data.

The estimation unit 86 estimates characteristics of the first transmission line 9 and the second transmission line 10 between the video transmitter 2 and the video receiver 3 from the arrival time of each packet in the video receiver 3. Here, the characteristic of the transmission line 4 is estimated from the difference in arrival time between the packet received from the first transmission line 9 and the packet received from the second transmission line 10.

An example of the method of estimating the RTP packet arrival time difference in the estimation unit 86 of the video receiver 8 will be described below. The estimation unit 86 can specify the RTP packet for transmitting the same video essence between two paths by referring to the sequence number of the RTP header.

For a set of corresponding RTP packets, when a packet arrival time on the first transmission line 9 side is defined as $T_1$ and a packet arrival time on the second transmission line 10 side is defined as $T_2$, an arrival time difference is calculated as $T_2-T_1$. When the value is positive, the RTP packet on the second transmission line 10 side is delayed. When the value is negative, the RTP packet on the first transmission line 9 side is delayed.

The estimation unit 86 transmits an estimation value D of the arrival time difference to the control unit 75 of the video transmitter 7. In order to reduce the influence of delay jitter, an average value of $T_2-T_1$ may be adopted as D.

Next, a method of specifying the transmission timing of the RTP packet will be described. When the control unit 75 of the video transmitter 7 receives the estimated value D of the RTP packet arrival time difference, the control unit 75 sets a fixed delay to the first transmitting unit 73 or the second transmitting unit 74. When D is positive, the first transmitting unit 73 delays transmitting to the first transmission line 9 by D after the second transmitting unit 74 transmits to the second transmission line 10. When D is negative, the second transmitting unit 74 delays transmitting to the second transmission line 10 by IDI after the first transmitting unit 73 transmits to the first transmission line 9.

In general, in the seamless protection transmission, the difference of the RTP packet arrival time caused by a difference in path length may occur. Seamless protection requires waiting at the receiving side for RTP packet integration, but if the arrival time difference is too large, buffer overflow may occur. In order to prevent the occurrence of buffer overflow, it is also necessary to take a large receiving buffer.

On the other hand, in the video transmission system 6 according to the second embodiment, the transmission timing of the video transmitter 7 is adjusted such that RTP packets having the same sequence numbers arrive at the video receiver 8 at the same time. Thus, the waiting time of the RTP packet in the video receiver 8 can be reduced.

In the second embodiment, a reducible buffer size is estimated. The buffer size is a sum of the buffer sizes which can be reduced for each of the transmitting buffer 72, the first receiving buffer 83 and the second receiving buffer 84. As a premise, the maximum value of the jitter allowable time in the receiving buffer is assumed to be $\Delta$. $\Delta$ is a design parameter of the video receiver and is a given value. Also, the RTP packet arrival time difference is defined as D. D is a value determined by the first transmission line 9 and the second transmission line 10. Also, the bit rate per video is assumed to be R. R is a value determined by the video format.

First, in a general video transmission system using seam protection, when the delay jitter and the arrival time difference are absorbed only by the receiving buffer, a required buffer size is $2R*(\Delta+D)$, in order to secure a capacity which can be absorbed by both the first receiving buffer and the second receiving buffer. On the other hand, in the second embodiment, the required transmitting buffer size is $R*D$, the required receiving buffer size is $2R*\Delta$ in both the first receiving buffer 83 and the second receiving buffer 84, and thus the required buffer size in total is $R*(2\Delta+D)$. Therefore, in the video transmission system 6 according to the second embodiment, the buffer size can be reduced by the amount of $R*D$.

Third Embodiment

In the third embodiment, a description will be given regarding the case where each of the video transmitter 7 and the video receiver 8 is implemented by a program for realizing the respective functions, in hardware of the same specification including an FPGA (Field Programmable Gate Array). The hardware includes a FPGA, a memory, and a communication device, and further may include a CPU, a storage, an input device and an output device. By making the hardware of the same specification function as either the video transmitter 7 or the video receiver 8 at the installation site, the reduction in cost at the installation site can be expected.

In the third embodiment, the buffer size of the transmitting buffer 72 of the video transmitter 7 and the total buffer size of the first receiving buffer 83 and the second receiving buffer 84 of the video receiver 8 are the same M.

The bit rate per video is defined as R, the RTP packet arrival time difference is defined as D, and the jitter allowable time is defined as $\Delta$.

In the case where $D \leq M/R$ is satisfied, the transmitting buffer 72 absorbs the RTP packet arrival time difference, and the first receiving buffer 83 and the second receiving buffer 84 absorb the delay jitter. At this time, $\Delta = M/(2R)$ is established.

In the case where $D > M/R$ is satisfied, the transmitting buffer 72 absorbs the RTP packet arrival time difference, and the first receiving buffer 83 and the second receiving buffer 84 absorb the residual difference of the RTP arrival time difference, and the delay jitter. At this time, $\Delta = (3M)/(2R)-D$ is established.

On the other hand, when the RTP packet arrival time difference and the delay jitter are absorbed only by the first receiving buffer 83 and the second receiving buffer 84, an absorbable jitter allowable time $\Delta$ becomes $\Delta = M/(2R)-D$. However, $D \leq M/(2R)$ is satisfied.

Therefore, the jitter allowable time expanded by the third embodiment is a region corresponding to the difference between the solid line and the broken line in FIG. 5.

For each of the video transmitters 2 and 7 and the video receivers 3 and 8 of the present embodiment described above includes, for example, a general-purpose computer system is used which includes a CPU (Central Processing Unit) 901, a memory 902, a storage 903 (HDD: Hard Disk Drive, SSD: Solid State Drive), a communication device 904, an input device 905, and an output device 906. In this computer system, each function of the video transmitters 2 and 7 and the video receivers 3 and 8 is realized by the CPU 901 executing a predetermined program loaded to the memory 902.

Note that each of the video transmitters 2 and 7 and the video receivers 3 and 8 may be implemented by a single computer, or may be implemented by a plurality of computers. In addition, each of the video transmitters 2 and 7 and the video receivers 3 and 8 may be a virtual machine implemented on the computer.

The respective programs for the video transmitters 2 and 7 and the video receivers 3 and 8 can be stored in a computer-readable recording medium such as an HDD, an SSD, a USB (Universal Serial Bus) memory, a CD (Compact Disc), and a DVD (Digital Versatile Disc) or distributed over a network.

Note that the present invention is not limited by the above embodiments, and various modifications are available within the scope and gist of the invention.

REFERENCE SIGNS LIST

1 Video transmission system
2, 7 Video transmitter
3, 8 Video receiver
4, 9, 10 Transmission line
21, 71 Generation unit
22, 72 Transmitting buffer
23, 73, 74 Transmitting unit
24, 75 Control unit
31, 81, 82 Receiving unit
32, 83, 84 Receiving buffer
33, 85 Reproducing unit
34, 86 Estimation unit
901 CPU
902 Memory
903 Storage
904 Communication device
905 Input device
906 Output device

The invention claimed is:

1. A video transmission system comprising:
a video transmitter, comprising one or more processors, configured to store a packet of video data in a transmitting buffer and transmit the packet stored in the transmitting buffer;
a video receiver, comprising one or more processors, configured to receive the packet; and
an estimation unit, comprising one or more processors, configured to estimate a characteristic of a transmission line between the video transmitter and the video receiver from an arrival time of each packet in the video receiver, wherein
the characteristic is estimated from a delay jitter of each packet,
the estimation unit specifies a delay jitter pattern from the delay jitters corresponding to packets in a packet group, and
the video transmitter is configured to:
determine an adjusted transmission timing by adjusting a regular transmission timing determined based on a constant packet transmission interval with a timing change that is determined based on the estimated characteristic of the transmission line, and transmit the packet at the adjusted transmission timing.

2. The video transmission system according to claim 1, wherein
the video transmitter is configured to transmit the packet of the video data to each of a first transmission line and a second transmission line,
the video receiver is configured to complement the video data using the packet received from each of the first transmission line and the second transmission line,
the estimation unit is configured to estimate the characteristic from an arrival time difference between a packet received from the first transmission line and a packet received from the second transmission line, and
the video transmitter is configured to transmit a packet to a transmission line having an early arrival time after a time in accordance with the arrival time difference has elapsed after the packet is transmitted to a transmission line having a late arrival time.

3. The video transmission system according to claim 2, wherein
each of the video transmitter and the video receiver is implemented by a program for realizing respective functions, in hardware of the same specification including an FPGA, wherein
the video transmitter has a transmitting buffer and the video receiver has a first receiving buffer to store a packet received from the first transmission line, a second receiving buffer to store a packet received from the transmission line, and a buffer size of the transmitting buffer and a total buffer size of the first receiving buffer and the second receiving buffer are the same.

4. A video transmission method comprising:
storing, by a video transmitter, a packet of video data in a transmitting buffer and transmitting the packet stored in the transmitting buffer;
receiving, by a video receiver, the packet;
estimating, by a computer, a characteristic of a transmission line between the video transmitter and the video receiver from an arrival time of each packet in the video receiver, wherein the characteristic is estimated from delay jitter of each packet, and the characteristic is a delay jitter pattern specified from delay jitter corresponding to packets in a packet group; and
determining, by the video transmitter, an adjusted transmission timing by adjusting a regular transmission timing determined based on a constant packet transmission interval with a timing change that is determined based on the estimated characteristic of the transmission line, and transmitting, by the video transmitter, the packet at the adjusted transmission timing.

5. A video transmitter comprising:
a transmitting buffer configured to store a packet of video data;
a transmitting unit, comprising one or more processors, configured to transmit the packet stored in the transmitting buffer to the video receiver; and
a control unit, comprising one or more processors, configured to receive a characteristic of a transmission line between the video transmitter and the video receiver estimated from an arrival time of each packet, from the video receiver, determine an adjusted transmission timing by adjusting a regular transmission timing determined based on a constant packet transmission interval with a timing change that is determined based on the estimated characteristic of the transmission line, and perform control of transmitting, by the transmitting unit, the packet at the adjusted transmission timing, wherein the characteristic is estimated from delay jitter of each packet, and the characteristic is a delay jitter pattern specified from delay jitter corresponding to packets in a packet group.

6. The video transmission system according to claim 2, wherein
the video transmitter is configured to transmit packets to each of the first transmission line and the second transmission line so that the packets having the same sequence numbers arrive at the video receiver at the same time; and the video receiver is configured to integrate two packets to which the same sequence number is attached, compensate the video data using the integrated packets, and reproduce the video data.

* * * * *